(12) United States Patent
Marone et al.

(10) Patent No.: US 8,559,022 B2
(45) Date of Patent: Oct. 15, 2013

(54) SENSOR APPARATUS INTENDED TO DETECT THE LEVEL OF A LIQUID, GEL OR POWER SUBSTANCE CONTAINED IN A RECEPTACLE

(75) Inventors: Giuseppe Marone, Nichelino (IT); Marco Musso, Courgne' (IT)

(73) Assignee: Elbi International S.p.A., Turin (IT)

( * ) Notice: Subject to any disclaimer, the term of this patent is extended or adjusted under 35 U.S.C. 154(b) by 202 days.

(21) Appl. No.: 13/260,028

(22) PCT Filed: Mar. 24, 2010

(86) PCT No.: PCT/IB2010/051278
§ 371 (c)(1),
(2), (4) Date: Sep. 23, 2011

(87) PCT Pub. No.: WO2010/109416
PCT Pub. Date: Sep. 30, 2010

(65) Prior Publication Data
US 2012/0019838 A1    Jan. 26, 2012

(30) Foreign Application Priority Data
Mar. 26, 2009   (IT) .............................. TO2009A0231

(51) Int. Cl.
*G01B 11/14*   (2006.01)
(52) U.S. Cl.
USPC ....................................................... 356/625
(58) Field of Classification Search
USPC ....................................................... 356/625
See application file for complete search history.

(56) References Cited

U.S. PATENT DOCUMENTS

| | | | |
|---|---|---|---|
| 3,954,010 A * | 5/1976 | Hilblom | 73/291 |
| 5,534,708 A | 7/1996 | Ellinger et al. | |
| 6,857,439 B1 | 2/2005 | Perruca et al. | |
| 7,820,995 B2 * | 10/2010 | Gadini et al. | 250/576 |

FOREIGN PATENT DOCUMENTS

EP     1 795 110 A2    6/2007

OTHER PUBLICATIONS

International Search Report of PCT/IB2010/051278 dated Jul. 16, 2010.

* cited by examiner

*Primary Examiner* — Roy M Punnoose
*Assistant Examiner* — Jamil Ahmed
(74) *Attorney, Agent, or Firm* — Sughrue Mion, PLLC

(57) ABSTRACT

The sensor apparatus is intended to detect the level of a liquid, gel or powder substance contained in a receptacle and includes an emitter able to emit radiation and a receiver able to receive and convert into an electric signal radiation which is emitted by the emitter and the intensity of which is variable depending on the quantity or level of substance present in the receptacle. The emitter is designed to emit visible radiation and the apparatus also includes a visible optical indicator and an optical element able to couple optically the emitter to the optical indicator so that, when the quantity or level of the substance in the receptacle is lower than a predetermined threshold, a fraction of the radiation generated by the emitter is able to light up the optical indicator.

10 Claims, 7 Drawing Sheets

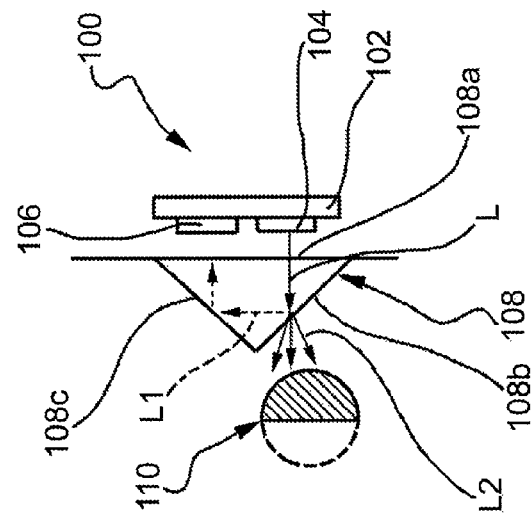
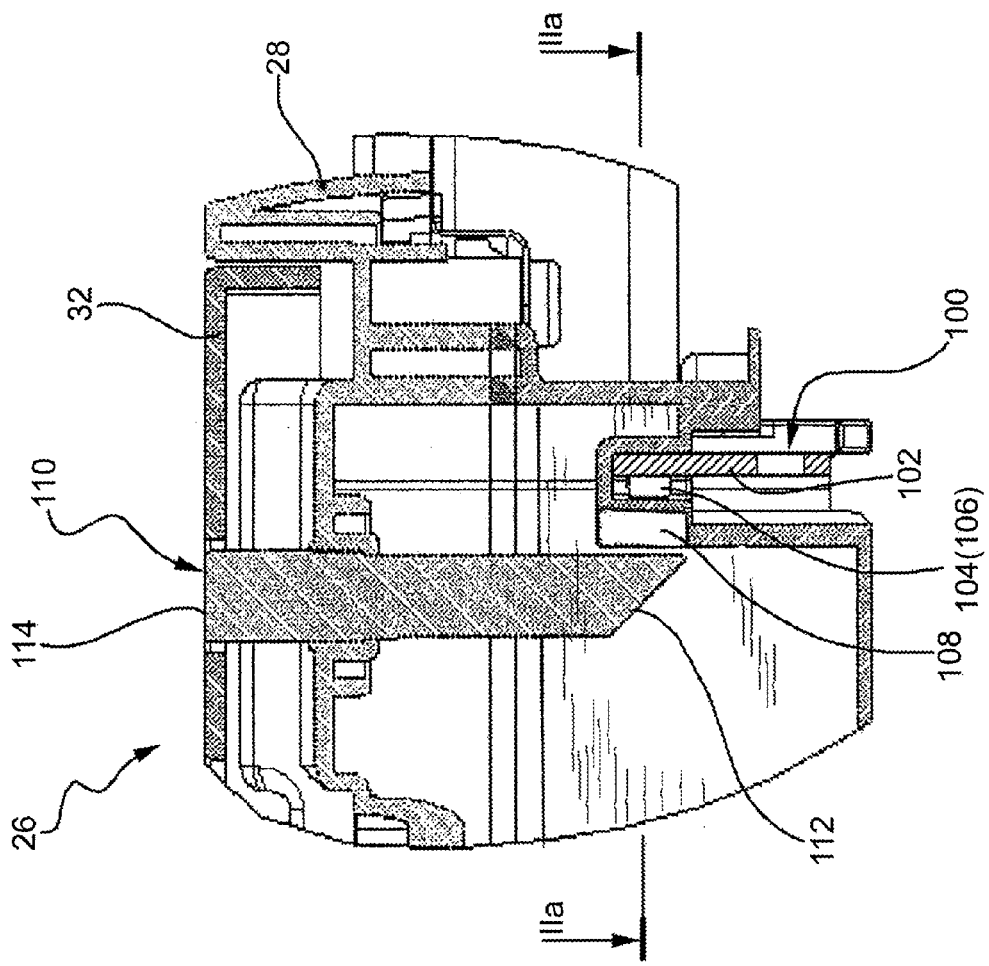
FIG.2a
FIG.2

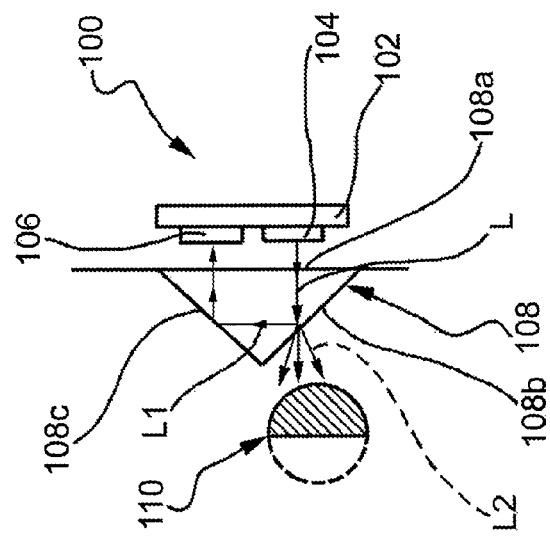
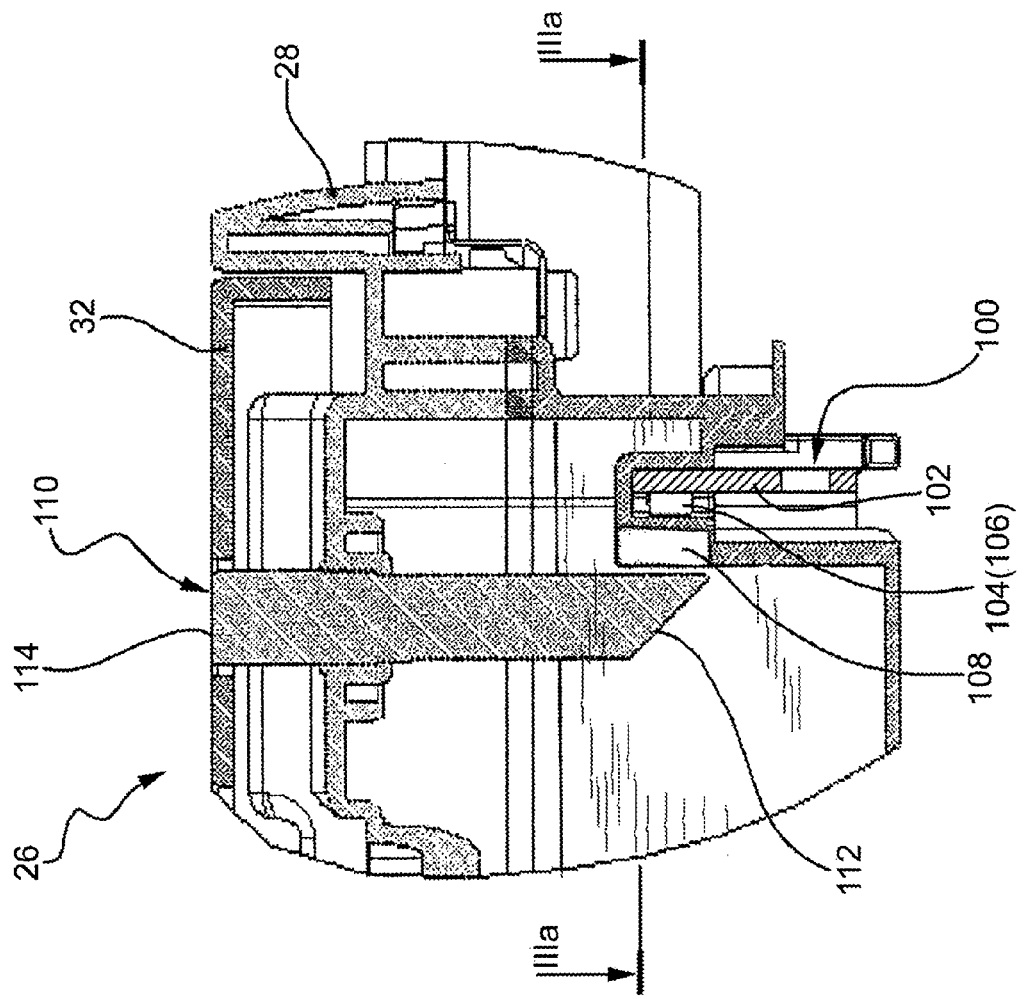

SENSOR APPARATUS INTENDED TO DETECT THE LEVEL OF A LIQUID, GEL OR POWER SUBSTANCE CONTAINED IN A RECEPTACLE

CROSS REFERENCE TO RELATED APPLICATIONS

This application is a National Stage of International Application No. PCT/IB2010/051278 filed Mar. 24, 2010, claiming priority based on Italian Patent Application No. TO2009A000231 filed Mar. 26, 2009, the contents of all of which are incorporated herein by reference in their entirety.

FIELD OF INVENTION

The present invention relates to a sensor apparatus intended to detect the level of a liquid, gel or powder substance contained in a receptacle.

More specifically the present invention relates to a sensor apparatus according to the preamble of claim 1.

BRIEF SUMMARY OF THE INVENTION

Apparatus for detecting the level of a substance present in a receptacle, particularly in sectors such as the household appliances sector, are known in the present state of the art. For example, these apparatus are widely used in dishwashing machines for the purpose of detecting the level of rinsing agent, or salt, present inside the receptacles associated with a dispensing device or a limescale-removal device.

The apparatus of the type specified above make use of the combined action of an emitter and a receiver which are associated with a receptacle containing a liquid, gel or powder substance. The emitter is designed to emit radiation. The receiver, usually a photodiode or a phototransistor, is able to receive and convert into an electric signal radiation which is emitted by the emitter and the intensity of which is variable depending on the quantity or level of substance present in the receptacle.

Usually these apparatus have the function of indicating the reserve level of the liquid depending on the intensity of the radiation received. An optical device intended to reflect and/or refract the radiation depending on the refraction index of the means present in the receptacle and facing the optical device is typically arranged between the emitter and the receiver. In the case where the liquid means exceeds a predetermined threshold value, its level is situated facing the optical device and the radiation is mainly refracted through the liquid means, being dispersed. In the opposite case, its level is below the optical element and therefore the light radiation is mainly reflected towards the receiver which is able to indicate to a control circuit that a reserve level has been reached.

Although this type of apparatus envisages an electrical system for performing signalling to the machine, it does not provide at the same time a visual indication relating to the level of the substance present in the receptacle.

One object of the present invention is to provide a sensor apparatus of the abovementioned type which is able to provide also a visual indication of the level of the substance present in the receptacle in a way which can be directly seen by the user, is operationally reliable and can be manufactured in a simple and low-cost manner.

This object, together with others, is achieved according to the present invention by means of a sensor apparatus defined by the characteristic features contained in the accompanying claim 1.

As a result of these characteristic features the sensor apparatus is able to exploit fully the same visible radiation emitted by the emitter both for an electric signal and for an optical signal which can be seen by a user.

BRIEF DESCRIPTION OF THE DRAWINGS

Further characteristic features and advantages of the present invention will become clear from the following detailed description provided purely by way of a non-limiting example, with reference to the accompanying drawings in which:

FIG. 2 is an enlarged and partly sectioned view along the line II-II of FIG. 1 of the dispensing device in the configuration corresponding to the condition where the door is open;

FIG. 2a is a partial, schematic, cross-sectional view of the sensor apparatus along the line IIa-IIa of FIG. 2;

FIG. 3 is a view which is similar to that of FIG. 2, but which shows the dispensing device in a second filling condition;

FIG. 3a is a partial, schematic, cross-sectional view of the sensor apparatus along the line IIIa-IIIa of FIG. 3;

DETAILED DESCRIPTION OF THE INVENTION

Figure 1:
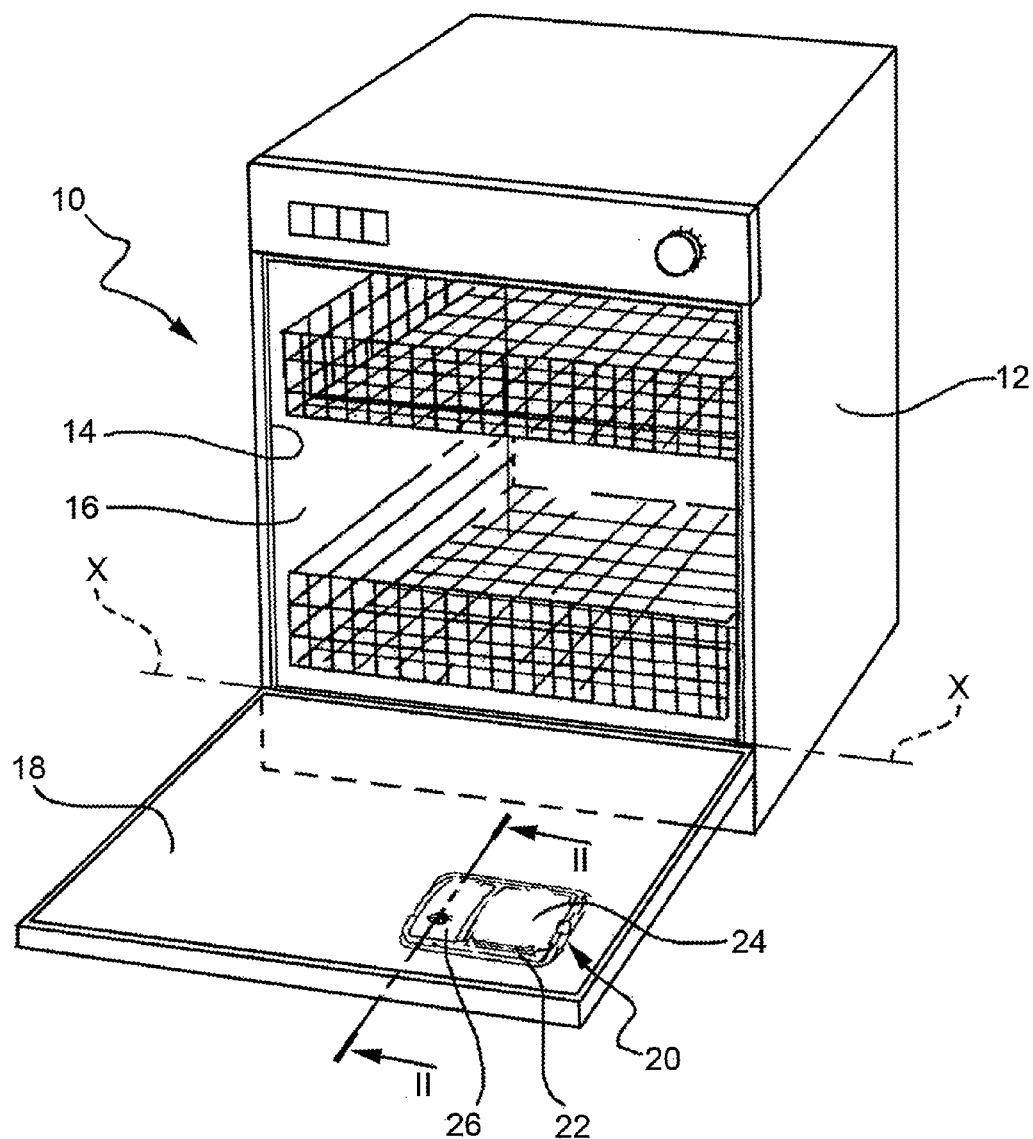
FIG. 1 is a perspective view of a dishwashing machine, the door of which includes a rinsing agent dispensing device provided with a receptacle which comprises a first example of embodiment of a sensor apparatus according to the present invention.

In FIG. 1, 10 denotes overall a dishwashing machine of the type known per se.

The machine 10 generally comprises a housing 12 which has a substantially parallelepiped shape and which defines internally a washing chamber 14 which can be accessed via an open front side 16 of the housing 12 with which a closing door 18 is associated. The door 18 is hinged on the structure of the machine 10 along a horizontal axis X-X in the vicinity of its bottom horizontal side.

The door 18 is therefore capable of assuming a vertical position (not shown) in which it closes off the washing chamber 14 and a lowered position, shown in FIG. 1, where it allows easy access to a device for dispensing washing agents, denoted overall by 20.

In a manner known per se the dispensing device 20 is mounted on the inner side of the door 18 of the machine 10. In this example of embodiment said dispensing device 20 is of the so-called integrated type, i.e. it comprises a single support structure or body 22 which contains both a device for dispensing a liquid or solid or powder washing agent and a device 26 for dispensing a rinsing or brightening agent.

The present invention is however not to be regarded as being limited to implementation in a device for dispensing washing agent integrated with an adjacent device for dispensing rinsing agent. In fact, as will become clear from the description below, the present invention may be applied to any receptacle intended to contain a liquid, gel or powder substance.

With reference to FIG. 2, this shows partly cross-sectioned the dispensing device 26 for the rinsing agent.

The inner walls of the dispensing device 26 form a receptacle 28 defining an inner chamber 30 which contains a quantity of rinsing agent which—as shown in FIG. 2—lies above a reserve threshold level. Furthermore, the receptacle 28 comprises a sensor apparatus 100 according to the present invention.

The sensor apparatus 100 is arranged in a wall of the receptacle 28 and comprises a support plate 102 which carries an emitter 104 and a receiver 106.

As can be seen more clearly in FIG. 2a, the sensor apparatus 100 also comprises an optical element, by way of example a triangular prism 108 preferably in the form of a right-angled triangle. Advantageously, the emitter 104 (for example an LED) and the receiver 106 are arranged facing the hypotenuse face or side 108a of said triangular prism 108. Instead the cathetus faces or sides of this triangular prism 108 define, respectively, a first reflective face 108b and a second reflective face 108c which are directed towards the inner chamber 30 of the receptacle 28.

The sensor apparatus comprises furthermore an optical waveguide, for example a semi-transparent rod 110, which is fixed to a portion of the receptacle 28. The semi-transparent rod 110 emerges inside the chamber 32 in a position at least partly facing the triangular prism 108. The semi-transparent rod 110 has advantageously a reflective face 112 which is inclined for example at about 45° with respect to its longitudinal axis and which faces the triangular prism 28. This semi-transparent rod 110 terminates at the top on the lid with its signalling end 114 directed outwards.

Preferably the rectangular edge of the triangular prism 108 (i.e. the edge where the two reflective faces 108b and 108c intersect each other) is parallel to the longitudinal axis of the rod 110.

The triangular prism 108 is able to couple optically the emitter 104 and the signalling end 114 which acts as an optical indicator which is visible in the manner which is described hereinbelow.

In the condition shown in FIGS. 2 and 2a, the receptacle 28 has internally a level of rinsing agent above the signalling threshold of the apparatus 100. The emitter 104 emits visible radiation L which is deviated so as to be reflected and refracted by the first reflective face 108b of the triangular prism 108 in a first reflected fraction L1 and a second refracted fraction L2, respectively. In this case, the level of the rinsing agent is above the surface of the triangular prism 108. Therefore, the refraction index, which is present inside the chamber 30 and is influenced by the presence of the rinsing agent, is such that the fraction L1 which is reflected and then deviated by the second reflective face 108c has an intensity sufficient to activate the receiver 106 (advantageously a photodiode or a phototransistor). Furthermore the refracted fraction L2 has a significant radiating intensity, but passing through the rinsing agent in liquid form is dispersed inside the chamber 30, without managing to reach the semi-transparent rod 110 with an intensity sufficient to intercept the reflective face 112 so as to provide a visible indication at the signalling end 114.

With reference to FIGS. 3 and 3a (again relating to the horizontal position of the door 18), the receptacle 28 has internally a level of rinsing agent below the signalling threshold of the apparatus 100. In this case, the level of the rinsing agent is below the surface of the triangular prism 108. The refraction index of the prism 108 is therefore different from the previous index since there is no longer a liquid means which reaches the surface of the triangular prism 108. Therefore the triangular prism 108 is formed so that—in this condition—the first reflected fraction L1 has an intensity sufficient to activate the receiver 106 which sends to a control circuit (not shown) a signal indicating that the reserve level inside the receptacle 28 has been reached. At the same time, although the refracted fraction L2 has a low intensity, it is however able to reach the reflective face 112 of the semi-transparent rod 110 which deviates the refracted fraction L2 through it until it reaches the signalling end 114. Therefore a visual signal which can be seen by a user looking at the receptacle 28 in the horizontal (or open) position of the door 18 is emitted.

Advantageously, the first reflective face 108b and the second reflective face 108c define planes which are perpendicular to each other.

Figure 4:
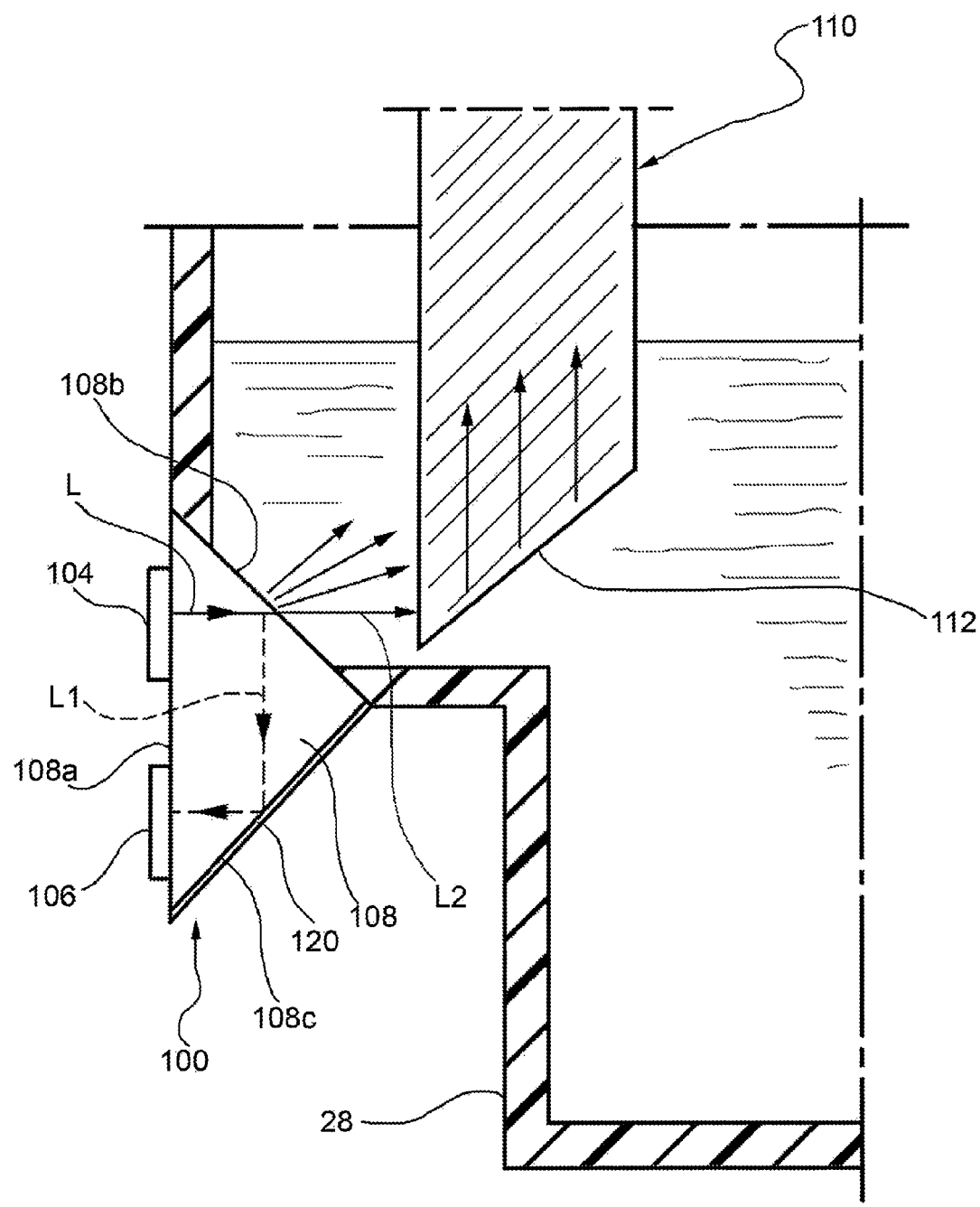
FIGS. 4 to 5 are partial schematic views which show two different variations of embodiment of the sensor apparatus according to the present invention.

With reference to FIG. 4, this shows a first variation of embodiment of the sensor apparatus according to the present invention. Parts which are similar to those of the previous embodiment are indicated by the same reference numbers and/or letters.

In contrast to the preceding embodiment, the right-angled edge of the triangular prism 108 is parallel with a straight line perpendicular to the longitudinal axis of the optical waveguide 110 (lowered position of the door 18). Furthermore the emitter 104 and the receiver 106 are preferably fixed on the hypotenuse face 108a of the triangular prism 108.

Figure 5:
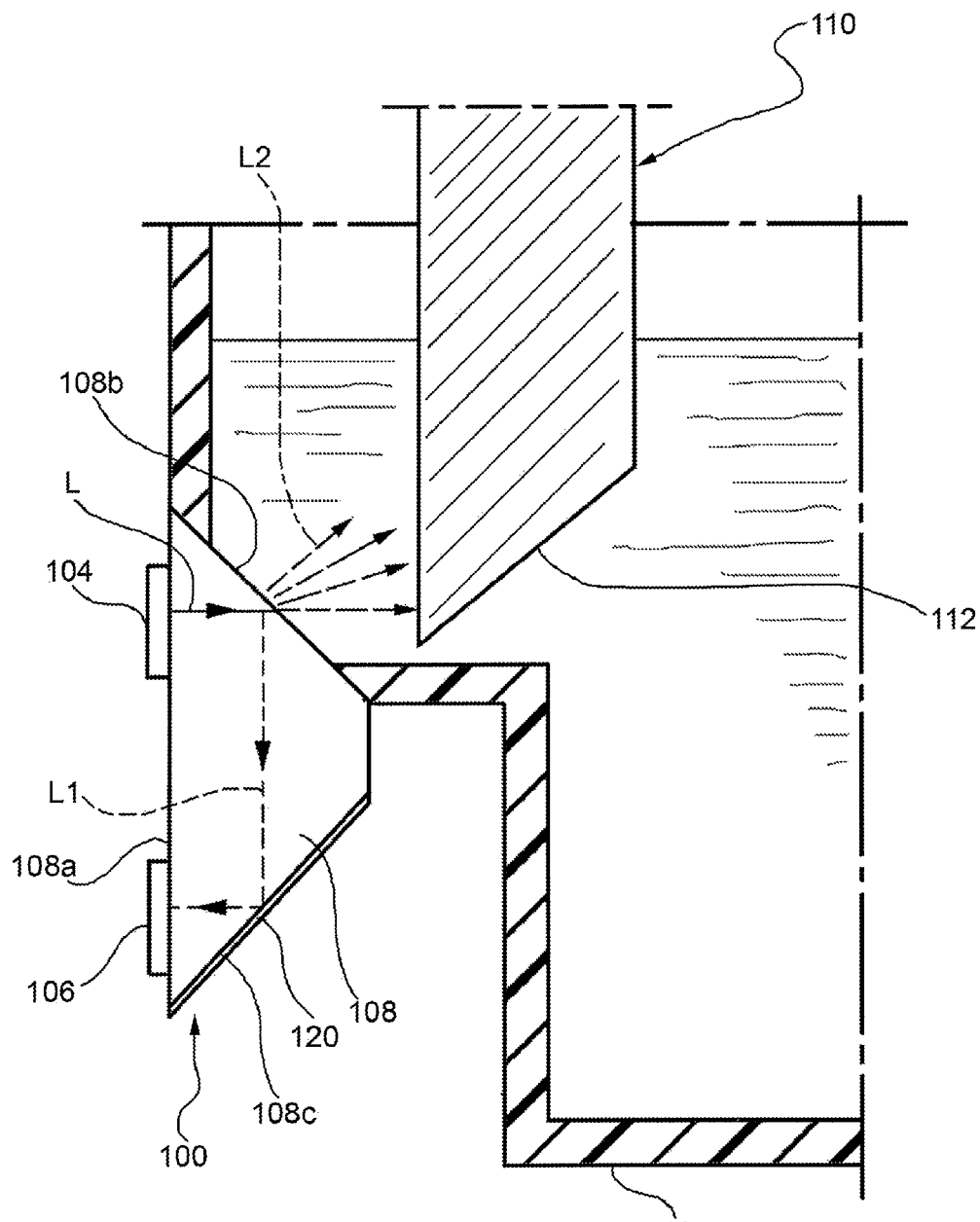

With reference to FIG. 5, this shows a second variation of embodiment of the sensor apparatus according to the present invention. Parts which are similar to those of the previous embodiment shown in FIGS. 1 to 3 are indicated by the same reference numbers and/or letters.

In contrast to the embodiment shown in FIGS. 1 to 3, the optical element is a prism 108 which has a cross-section which is in the form of an isosceles trapezium. The emitter 104 and the receiver 106 are advantageously fixed to the large-base face 108a of the prism 108. Preferably the larger-base side of the prism 108 is parallel to the longitudinal axis of the optical waveguide 110. The first reflective face 108b and the second reflective face 108c are defined by the oblique sides of the prism 108.

Preferably, in the first and second variation of embodiment shown in FIGS. 4 and 5, only the first reflective face 108b is directed towards the inside of the container 28.

Furthermore, the second reflective face 108c has preferably a coating 120 suitable for optimising reflection towards the receiver 106 and minimising the refraction of the radiation striking the aforementioned second reflective face.

Figure 6:
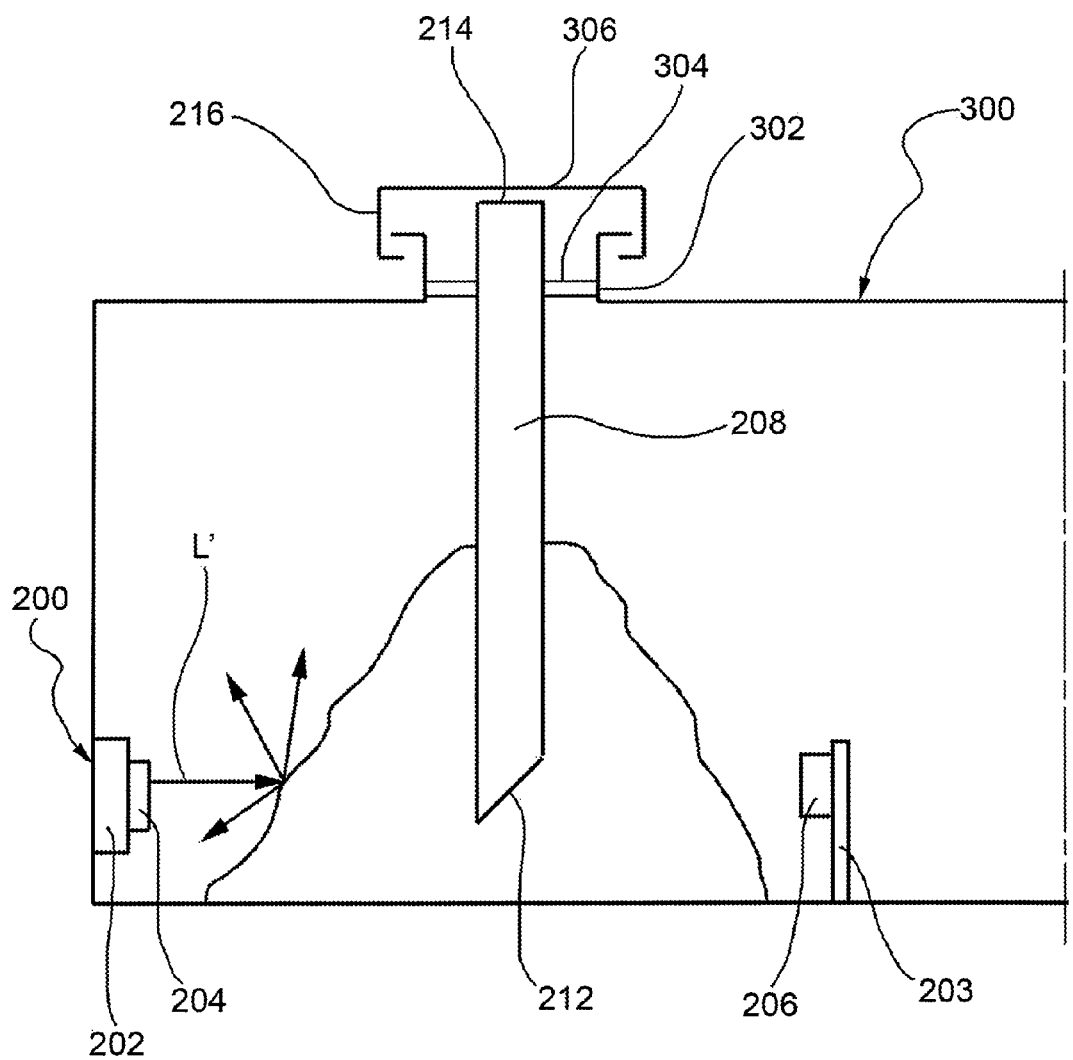
FIG. 6 is a schematic cross-sectional view of a limescale-removal device with a receptacle which is provided with a second example of embodiment of a sensor apparatus according to the present invention and which is shown in a first filling condition.
Figure 7:
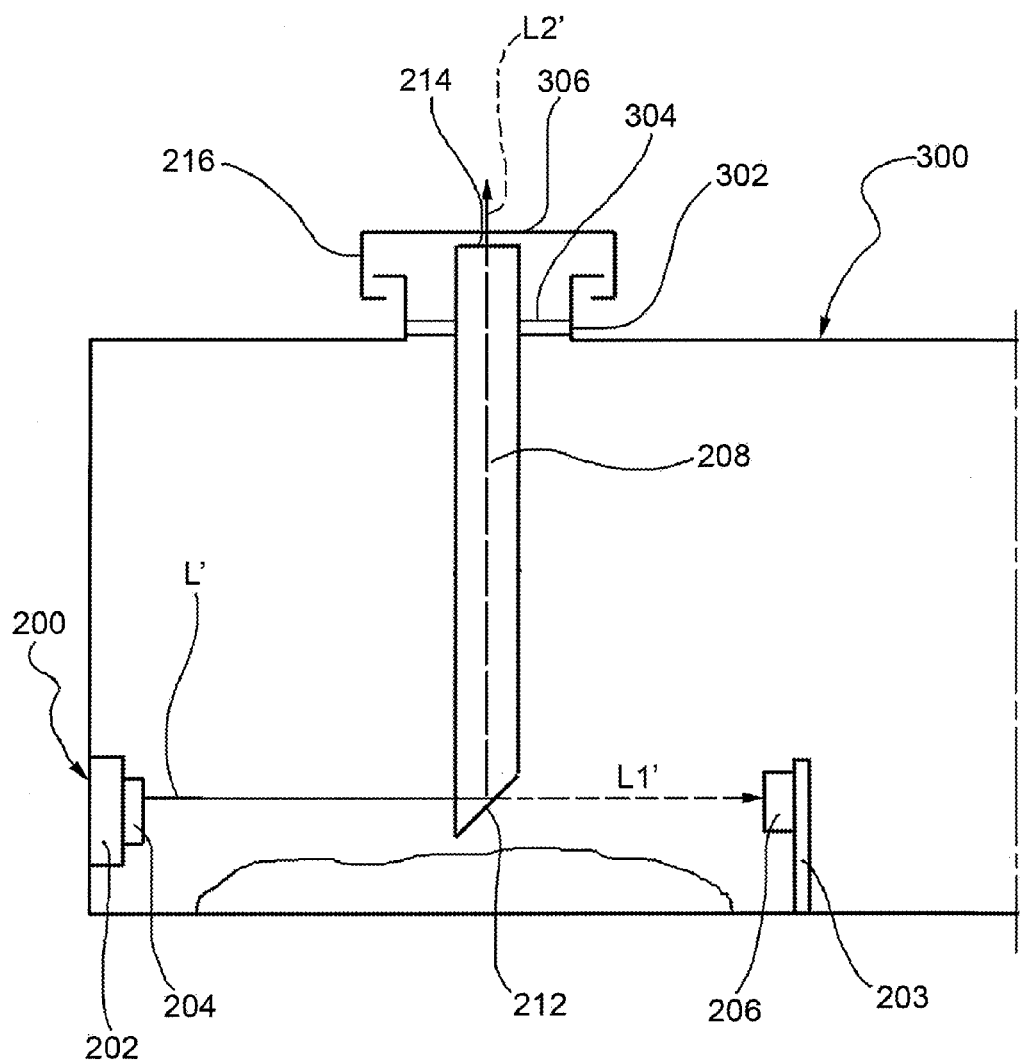
FIG. 7 is a view which is similar to that of FIG. 6, but which shows the receptacle in a second filling condition.

With reference to FIGS. 6 and 7, these show a second embodiment of the sensor apparatus according to the present invention, denoted overall by 200.

In this embodiment the sensor apparatus 100 is applied to a receptacle 300 of a limescale-removal device for dishwashing machines (details not shown). The sensor apparatus 200 comprises a first support plate 202 fixed onto a wall of the receptacle 300 and having an emitter 204 and a second support plate 203 fixed to the bottom of the receptacle 300 and having a receiver 206 directed towards the emitter 204.

Furthermore, the apparatus has an optical waveguide, advantageously a semi-transparent rod 208 which is fixed in the region of the neck 302 of the container 300 by means of a plurality of radial spokes 304. The semi-transparent rod 208 comprises a bottom reflective face 212 and a signalling end 214 which is directed towards the transparent lid 306 of the receptacle 300. The semi-transparent rod 208 is arranged between the emitter 204 and the receiver 206 so that the radiation L' emitted by the emitter 204 is directed towards the bottom reflective face 212.

With reference to FIG. 6, the level of the powder material present in the receptacle 300 exceeds the signalling threshold of the apparatus 200 and covers the semi-transparent rod 208 so that it obstructs the radiation L' which is unable to reach the bottom reflective face 212. In this way no radiation reaches either the signalling end 214 of the semi-transparent rod 208 nor the receiving device 206.

With reference to FIG. 7, the level of the powder material present in the receptacle 300 exceeds the signalling threshold of the apparatus 200. In this condition, the level of powder material is below the bottom reflective face 212. Consequently, the radiation L', which is within the visible spectrum, is transmitted by the reflective face 212 in a first fraction L', which continues its path towards the receiver 206, and a second fraction L2'. The reflected fraction L2' passes along the length of the semi-transparent rod 208 and lights up the signalling end 214. The reflected fraction L2' is directed towards 206 and has an intensity such as to activate it so as to signal a reserve level of powder material to a control circuit (not shown). In this way the semi-transparent rod 208 acts not only as an optical waveguide for the signalling end 214, but also as an optical element for selectively coupling this signalling end 214 to the emitter 204.

Obviously, without affecting the principle of the invention, the embodiments and the constructional details may be greatly modified with respect to that described and illustrated purely by way of a non-limiting example, without thereby departing from the scope of the invention as defined in the accompanying claims.

The invention claimed is:

1. Sensor apparatus intended to detect the level of a liquid, gel or powder substance which is contained in a receptacle comprising:
   an emitter that emits radiation;
   a receiver that receives and convert into an electric signal, radiation which is emitted by the emitter and the intensity of which is variable depending on the quantity or level of substance present in the receptacle,
   wherein the emitter is designed to emit visible radiation, and,
   wherein said apparatus further comprises: a visible optical indicator and an optical element to optically couple the emitter to said optical indicator in such a way that, when the quantity or level of the substance in the receptacle is lower than a predetermined threshold, a fraction of the radiation generated by the emitter lights up said optical indicator.

2. Sensor apparatus according to claim 1, wherein the optical element selectively deviates the visible radiation emitted by the emitter in a first radiation directed toward the receiver and in a second fraction directed towards said optical indicator.

3. Sensor apparatus according to claim 1, wherein the path of the radiation directed towards the optical element is hindered when said substance is above said threshold level.

4. Sensor apparatus according to claim 1, further comprising an optical waveguide optically coupled to said optical element and intended to guide through it a fraction of the radiation emitted by the emitter and to direct said fraction towards the optical indicator.

5. Sensor apparatus according to claim 4, wherein said optical waveguide is a rod made of semitransparent material.

6. Apparatus according to claim 5, wherein said rod has a reflective face intended to intercept the radiation emitted by the emitter and reflect it through said rod towards the optical indicator.

7. Apparatus according to claim 6, wherein said optical indicator comprises an end of said rod.

8. Apparatus according to claim 4, wherein said optical waveguide comprises said optical element.

9. Apparatus according to claim 1, wherein said optical element has a first reflective face and a second reflective face; said first reflective face being intended to receive the radiation emitted by the emitter and deviate said radiation partially towards said second reflective face which in turn is capable of directing said radiation towards the receiver.

10. Receptacle including a sensor apparatus according to claim 1.

* * * * *